United States Patent
Monnerie (10) Patent No.: US 9,497,726 B2
(45) Date of Patent: Nov. 15, 2016

(54) SYSTEMS AND METHODS FOR WIRELESS NETWORK ROUTING USING RADIO FREQUENCY DISTANCE-BASED VIRTUAL NODE LOCATIONS

(75) Inventor: Emmanuel Monnerie, Cumming, GA (US)

(73) Assignee: Landis+Gyr Innovations, Inc., Alpharetta, GA (US)

(*) Notice: Subject to any disclaimer, the term of this patent is extended or adjusted under 35 U.S.C. 154(b) by 383 days.

(21) Appl. No.: 12/652,921

(22) Filed: Jan. 6, 2010

(65) Prior Publication Data
US 2011/0164531 A1 Jul. 7, 2011

(51) Int. Cl.
| | |
|---|---|
| *H04L 12/28* | (2006.01) |
| *H04W 4/00* | (2009.01) |
| *H04W 64/00* | (2009.01) |
| *G01S 5/02* | (2010.01) |
| *H04L 12/24* | (2006.01) |
| *H04L 12/26* | (2006.01) |
| *H04W 40/20* | (2009.01) |
| *H04W 84/18* | (2009.01) |

(52) U.S. Cl.
CPC ............ *H04W 64/00* (2013.01); *G01S 5/0289* (2013.01); *H04L 12/2416* (2013.01); *H04L 12/2647* (2013.01); *H04L 41/12* (2013.01); *H04L 43/0829* (2013.01); *H04W 40/20* (2013.01); *H04W 40/205* (2013.01); *H04W 84/18* (2013.01)

(58) Field of Classification Search
CPC ............ G01S 5/0289; H04L 12/2416; H04L 12/2647; H04L 41/12; H04L 43/0829; H04L 9/0872; H04L 12/5868; H04W 40/20; H04W 64/00; H04W 43/0829; H04W 4/02; H04W 4/023; H04W 4/04

USPC ............ 370/328, 338, 351, 400, 422; 455/422.1, 445
See application file for complete search history.

(56) References Cited

U.S. PATENT DOCUMENTS

| | | | |
|---|---|---|---|
| 4,939,726 A | 7/1990 | Flammer et al. | |
| 5,636,216 A | 6/1997 | Fox et al. | |
| 5,671,408 A * | 9/1997 | McBride | ........... G06F 17/30398 |

(Continued)

FOREIGN PATENT DOCUMENTS

| | | |
|---|---|---|
| WO | 2008112252 A1 | 9/2008 |
| WO | 2011085051 A2 | 7/2011 |

OTHER PUBLICATIONS

"Localization in Sensor Networks—A Matrix Regression Approach," Paul Honeine et al, 978-1-4244-2241-08/08, 2008 IEEE, pp. 284-287.

(Continued)

*Primary Examiner* — Hoang-Chuong Vu
(74) *Attorney, Agent, or Firm* — Kilpatrick Townsend & Stockton LLP (57) ABSTRACT

Devices and methods used in a wireless network employing geographical routing using virtual node locations. Such virtual node locations can be computed by a central computer that gathers information from some or all of the nodes. Each node may, for example, identify itself and its neighbors and provide a value indicative of the radio frequency (RF) distance to such neighbors. Examples of RF distance indicators include, but are not limited to, received signal strength indication (RSSI) and packet success rate (PSR). Geographic coordinates for none or some of the nodes may also be used to determine the virtual coordinates.

19 Claims, 4 Drawing Sheets

(GEOGRAPHIC TOPOGRAPHY)

(56) References Cited

U.S. PATENT DOCUMENTS

| | | | |
|---|---|---|---|
| 6,744,740 B2* | 6/2004 | Chen | 370/255 |
| 7,787,429 B2* | 8/2010 | Jeon et al. | 370/338 |
| 8,457,084 B2* | 6/2013 | Valmikam et al. | 370/338 |
| 8,553,865 B2* | 10/2013 | Menard | H04M 3/56 |
| | | | 348/14.09 |
| 2003/0012168 A1* | 1/2003 | Elson et al. | 370/338 |
| 2004/0147223 A1* | 7/2004 | Cho | H04L 12/66 |
| | | | 455/41.2 |
| 2004/0202160 A1* | 10/2004 | Westphal | 370/389 |
| 2004/0246911 A1* | 12/2004 | Bonsma et al. | 370/254 |
| 2005/0190717 A1* | 9/2005 | Shu et al. | 370/328 |
| 2006/0215624 A1* | 9/2006 | Adya et al. | 370/338 |
| 2007/0206503 A1 | 9/2007 | Gong et al. | |
| 2007/0257839 A1* | 11/2007 | Srinivasan et al. | 342/360 |
| 2008/0102855 A1* | 5/2008 | Forbes | G01S 5/0289 |
| | | | 455/456.1 |
| 2008/0107080 A1* | 5/2008 | Tsai | 370/331 |
| 2010/0002709 A1* | 1/2010 | Seal | H04W 40/20 |
| | | | 370/400 |
| 2012/0052884 A1* | 3/2012 | Bogatin | G01S 5/0284 |
| | | | 455/456.6 |

OTHER PUBLICATIONS

PCT/US2011/020290, "International Preliminary Report on Patentability", Feb. 14, 2013, 8 Pages.
PCT/US2011/02029, "International Search Report and Written Opinion", Jan. 25, 2013, 12 Pages.
MX/A/2012/007904, "Notice of Allowance", Dec. 13, 2013, 2 pages (Redacted).
NZ600570, "Further Examination Report", Dec. 18, 2013, 2 pages.
Mexican Patent Application No. MX/A/2012/007904, "Office Action", Sep. 12, 2013, 5 pages (redacted).
New Zealand Patent Application No. 600570, First Examination Report, issued Apr. 30, 2013, 2 pages.
NZ600570, "Further Examination Report", Jun. 30, 2014, 2 pages.
NZ600570, "Further Examination Report", May 13, 2014, 2 pages.
Australian Application No. 2011203667, First Examiner Report mailed on May 15, 2015, 2 pages.

\* cited by examiner

FIGURE 1
(GEOGRAPHIC TOPOGRAPHY)

FIGURE 2
(RF-BASED TOPOGRAPHY)

FIGURE 3

(GEOGRAPHIC TOPOGRAPHY)

FIGURE 4

(RF-BASED TOPOGRAPHY)

SYSTEMS AND METHODS FOR WIRELESS NETWORK ROUTING USING RADIO FREQUENCY DISTANCE-BASED VIRTUAL NODE LOCATIONS

TECHNICAL FIELD

This disclosure relates generally to network routing, and specifically relates to methods and systems for determining a network route path.

BACKGROUND

Various methods are known for routing network packets. For example, U.S. Pat. No. 4,939,726 entitled "Method for routing packets in a packet communication network," which is incorporated by this reference, describes forwarding packets from a source node to a target node via a series of intermediates using the target node's geographic coordinates. Each intermediate node selects a successor node using, among other things, the maximum forward geographic progress attainable, which is determined by calculating a metric incorporating the geographical distance between the coordinates of the target node and the coordinates of each potential successor node. Similarly, U.S. Pat. No. 5,636,216, entitled "Method for translating IP addresses to other distributed network addressing schemes," which is incorporated by this reference, describes using a network specific local address of a target node that incorporates the target's geographic coordinates.

Some networks are configured to determine and use radio nodes with latitude and longitude coordinates, which are shared amongst the radios of the network, for example, as radios discover one another. A radio uses the coordinate information about its neighbors to independently determine how to best route each packet based on the packet's final destination, for example by attempting to determine to which of the neighbors a packet should be sent in order to move it closest to the final destination. Various problems arise when one or more radio nodes in a network have different range patterns such as asymmetrical patterns. Such patterns may occur when a radio is under glass or otherwise obstructed within a utility meter.

Wireless mesh networks using geo-routing are more reliable than other types of networks but their main problem is that each node needs to be configured to have their geographical location. Getting such location information can be burdensome and inaccurate. One technique for addressing these issues involves routing packets using node virtual locations. For example, U.S. patent application Ser. No. 12/165,996, entitled "Systems and Methods for Network Routing Using Virtual Network Node Locations," which is incorporated by this reference, describes determining a virtual location, for example, by determining a geographic location that is central to other nodes with which a given node can communicate. Such a virtual location may more accurately represent an approximate center point of a node's communication range. Such virtual locations can then be used to make routing determinations. Alternative and complementary techniques for determining and using geographic and virtual locations are desirable for a variety of reasons.

SUMMARY

Systems and methods for wireless network routing with automatic and centralized coordinate assignment are disclosed. One example provides a wireless, self-configuring network that uses geographical routing based on coordinates that have been computed and assigned automatically by a central computer. Such a network may provide performance improvements over other geo-routing networks and/or provide resolve issues associated with network nodes located in the same address or general location (i.e., collocated nodes).

In one exemplary system, to compute node coordinates, a central computer gathers the information from the nodes. Each node may, for example, identify itself and its direct neighbors and provide a value indicative of the RF distance to such neighbors. Examples of RF distance indicators include, but are not limited to, received signal strength indication (RSSI) and packet success rate (PSR). Some of the nodes may also provide real coordinates. Alternatively, information about the real coordinates of some of the nodes may be provided to the central computer from one or more other sources. However received, using some real geographic coordinates provides reference point information for determining virtual coordinates for some of the other nodes. For example, depending on the node density, radio strengths, and other possible factors, the central computer may use real coordinates for only a small percentage, e.g., from 1% to 10%, of the population of nodes, to determine virtual coordinates for the other nodes.

Based on the reference points and the list of neighbors from each node, an algorithm computes node locations. In one exemplary system, virtual locations are determined using estimates or indications of RF distance from a given node to its neighboring nodes. How close a virtual location for a node is to that node's actual geographic location may depend on the percentage of reference points provided and on the connectivity between the nodes. In many circumstances, identifying virtual locations that differ from actual locations can provide certain benefits, such as, improved routing efficiency. An RF distance-based topology may be more appropriate for routing decisions. For example, since geographical network topology rarely matches RF-distance network topology, basing routing decisions on geographic topology can result in packets encountering dead ends, cul-de-sacs, and overall inefficiencies. Moreover, using virtual locations for some of the nodes in a network may reduce the burden of otherwise obtaining accurate actual geographic information for those nodes, eliminating many instances of having to capture a node location using geocoding or GPS data collection at the node locations.

One embodiment is a method that involves receiving general distance information for a first node of a network. The general distance information describes a quality communication between the first node and each of one or more neighboring nodes in the network. An example of such information is the average response time to a short request, which is also known as a ping. In the case of a wireless network, distance information could provide a measure of RF distance by providing RSSI and/or PSI. The method next involves determining a virtual location of the first node using the general distance information. Specifically, in such a determination distances between the virtual location of the first node and other geographic or virtual locations of other nodes reflects or otherwise corresponds to the quality of the respective node-to-node communication, i.e., the distance between the first node and a second node reflects the quality of communication between those two nodes. Once the virtual location of the first node is determined, it can be provided for use in routing messages in the network. For example, it may be provided to the first node itself and/or to the nodes that are neighbors of the first node. This exemplary method can be applied to both wired and wireless networks.

These embodiments are provided as examples to aid understanding. Additional embodiments and advantages are also discussed in the Detailed Description and will become readily apparent to those skilled in the art. The invention is capable of other and different embodiments, and its several details are not essential, but rather are capable of modifications in various obvious respects, all without departing from the invention. Accordingly, the drawings and description are to be regarded as illustrative, and not as restrictive.

BRIEF DESCRIPTION OF THE FIGURES

The above described and other features, aspects, and advantages of the present disclosure are better understood when the following Detailed Description is read with reference to the accompanying drawings, wherein.

DETAILED DESCRIPTION

Certain embodiments provide a wireless network using geographical routing based on coordinates that have been computed and assigned automatically by a central computer. To compute such coordinates, a central computer gathers information from some or all of the nodes in the wireless network. Such gathered information can include, as examples, node identification information and information about the neighboring nodes of each node and RF distance information about such neighboring nodes. Information about actual geographic locations of some or all of the nodes may also be collected.

The central computer can use the collected information to determine virtual locations for one or more nodes of the wireless network For example, using the one or more actual node locations as reference points and the information about RF distances of neighboring nodes, various algorithms and other techniques could be used to computer a virtual location for a given node. That determined virtual location for that node can then be provided to the nodes in the wireless network or otherwise used to facilitate routing in the wireless network.

Figure 1:
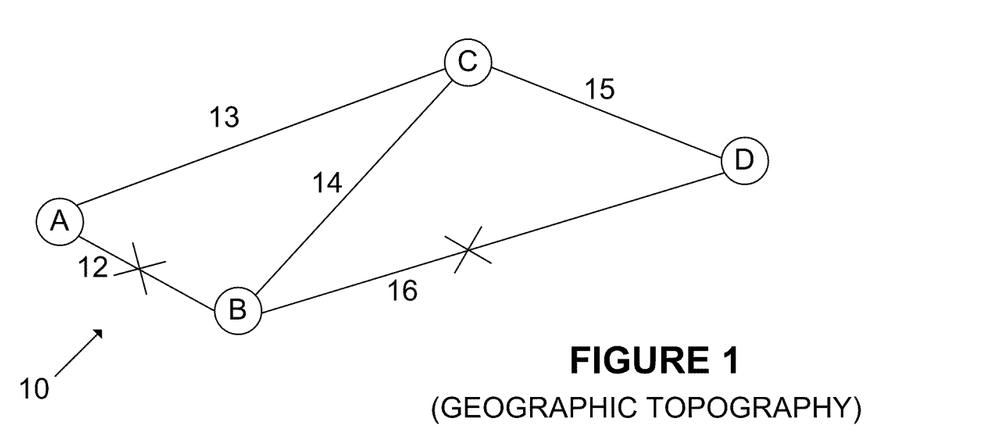
FIG. 1 is a network topology diagram illustrating geographic distances between the nodes of a network.
Figure 2:
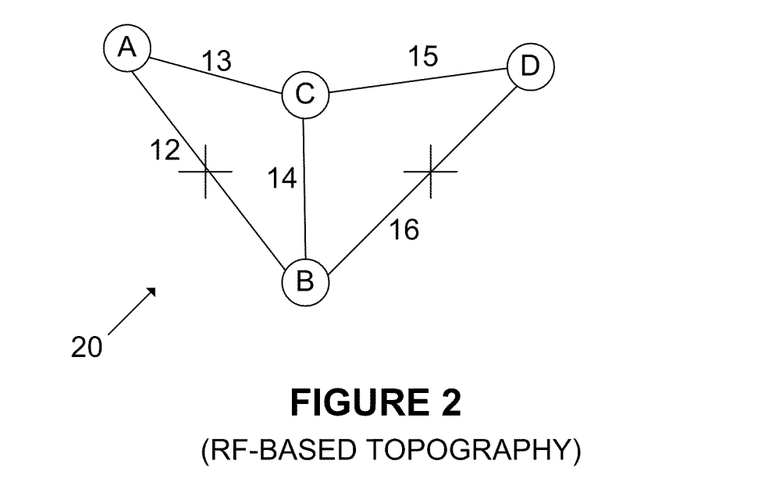
FIG. 2 is a network topology diagram illustrating the nodes of FIG. 1 in an RF-based topography in which one or more odes are positioned at RF distance-based virtual locations.

FIGS. 1 and 2 are network diagrams for a network 10 with four nodes A, B, C, and D. These figures illustrate an exemplary circumstance in which network routing based on an RF topography may be preferable to network routing based on a geographic coordinate topology. FIG. 1 illustrates geographic distances of the links 12, 13, 14, 15, 16 between the nodes A, B, C, and D. Based on these distances, a routing algorithm might select the closest nodes for the next hop, for example, resulting in sending a packet from A to D using the route A to B to C to D using links 12, 14, 15. However such a route may unknowingly use a non-reliable hop. For example, if hops 12 and 16 are unreliable links and hops 13, 14, and 15 are reliable links, then an exemplary routing algorithm may result in a failed attempt to communicate over link 13, which will affect the overall performance of the communication between nodes A and D.

FIG. 2 illustrates the nodes A, B, C, D of FIG. 1 in an RF-based topography 20 in which one or more of nodes A, B, C, and D are positioned at virtual locations rather than their actual, geographic locations. Because, in this example, such virtual locations were determined using RF distances, the lengths of the links 12, 13, 14, 15, 16 in the RF-based topography 20 provide estimates of the RF distance between those links. In other words, the distance of link 13 being less than the distance of link 12 illustrates that the RF distance between nodes A and C is less than the RF distance between nodes A and B, and thus that link 13 is likely a better link than link 12. Accordingly, in a system that uses RF distance-based virtual locations for at least some of its nodes, a routing algorithm may make better and/or simpler routing determinations. For example, a node might select the nearest node based on its own virtual location and the virtual locations of potential nodes to use as the next hop for a given message. For example, in FIG. 2, such selections may result in sending a packet from A to D using the route A to C to D, using links 13 and 15.

When using such locations for determining distances for routing purposes, determined distances will represent a measure of RF distance rather than of geographic distance and thus result in more efficient or otherwise better routing. In the example of FIG. 2, for routing purposes node A may determine its "distance" to neighboring nodes using the virtual locations of those nodes and/or its own virtual location to the extent virtual locations have been assigned to any of the nodes. Thus, node A's routing determinations may determine that the distance from A to C is less than the distance from A to B (as shown in FIG. 2) even though in terms of actual geography (FIG. 1), the actual geographic distance from A to B is less than the distance from A to C. In many circumstances, a routing algorithm using RF distance-based virtual coordinates will select a more efficient or otherwise better route than other routing algorithms.

Figure 3:
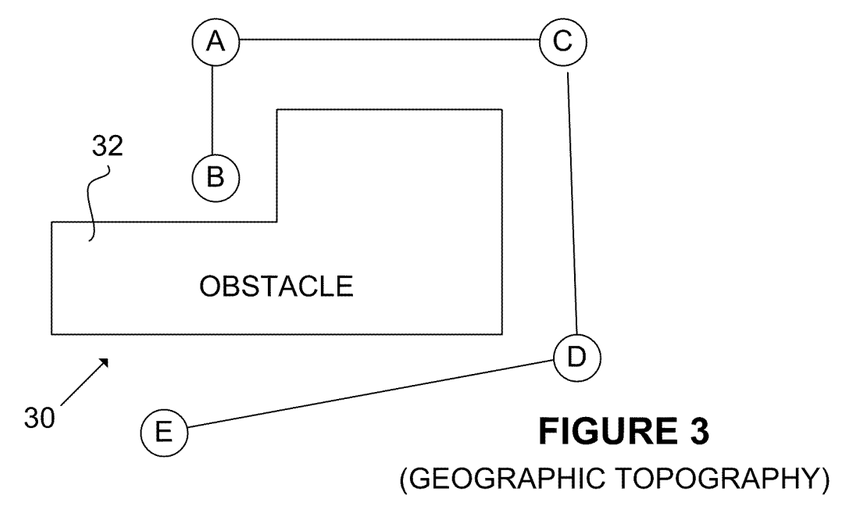
FIG. 3 is a network topology diagram illustrating geographic distances between nodes of a network.

FIG. 3 is another network diagram illustrating geographic distances between the nodes A, B, C, D, E of a network 30. When A tries to send a packet to E, it might target first the radio in that direction, B. However, B does not have connectivity to E or any other radio in the network 30, except for A, because of the obstacle 32. So, the packet will bounce back to A, and A will have to find an alternative route. In short, the obstacle 32 has created a geographical cul-de-sac that can result in delays and affect the overall performance of the network.

Figure 4:
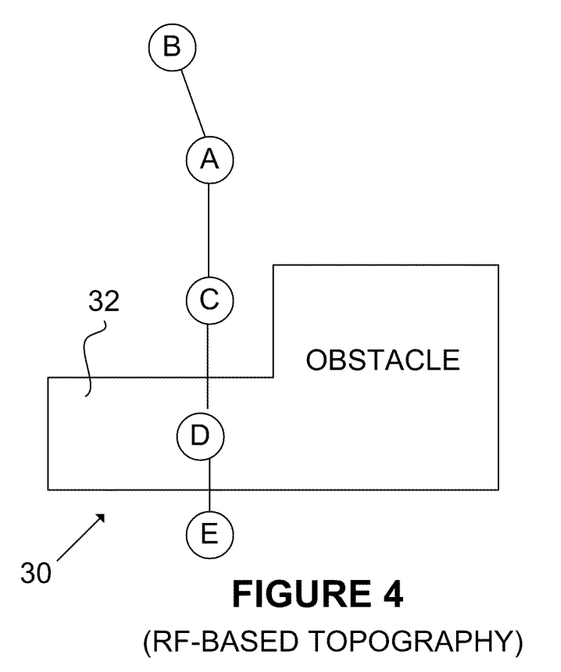
FIG. 4 is a network topology diagram illustrating the nodes of FIG. 3 in an RF-based topography in which one or more nodes are positioned at RF distance-based virtual locations.

FIG. 4 illustrates the nodes of FIG. 3 in an RF-based topography in which one or more of nodes A, B, C, D, E are positioned at RF distance-based virtual locations rather than at their actual geographic locations. Since B only has connectivity A, the RF distances between B and the others will be larger than the RF distance between A and the other nodes. A routing algorithm that utilizes the virtual locations to route a message from A to E will not choose B as the next hop, since that does not move the routed message closer to E.

Location information used in routing determinations can include a mix of virtual node locations and actual geographic node locations. Depending on the system, a node can have only one type of location information (i.e., geographic or virtual) or a node can have both types of location information associated with it. For example, a node could have two fields of information in its memory: one for the virtual location and one for the actual location. The second field could be optionally used, whenever the actual location is available, for example. Even if both types of location information are stored, a routing algorithm may use only one type, for example, always using the virtual location.

In one embodiment, the actual location of a node can be programmed (and reprogrammed) anytime. Various routing algorithms can be used, including algorithms that utilize actual node locations and algorithms that ignore actual node locations when virtual node location information is available. Thus, in a system that has virtual locations identified for all nodes and actual geographic locations for no nodes or for only some of the nodes, routing decisions can be based entirely on virtual location information or on a combination of virtual location and actual location information.

Exemplary Virtual Location Computation

Many methods can be used to determine virtual coordinates for a node. Determining virtual coordinates can involve processing input specifying RF-distance relationships amongst a set of nodes. Mathematically this can be modeled and solved as a problem involving equations and unknowns, for example, with unknowns for the X coordinate, Y coordinate, and Z (elevation) coordinate of each node. The equations are provided by the RF distances between a node and its neighbors with each node to neighbor link providing a distance equation in which the RF distance is known but the node virtual location coordinates are unknown. To reduce the number of unknowns, actual geographic coordinates may be used for one or more of the nodes. Providing such reference points, however, is not necessarily required depending on the network and may be extraneous in dense networks involving a very high ratio of links to nodes. Generally, in such calculations, if there are too many equations making solving complex or impractical, some links (i.e., equations) can be removed by setting a threshold on the minimum RF distance values to consider as input.

Solving a problem of equations and unknowns is a classic problem and many algorithms can be applied. One exemplary technique useful in providing an algorithm suited for the computation of nodes coordinates based on RF distance between neighbors is presented in "Localization in Sensor Network—A Matrix Regression Approach," Paul Honeine, Cedric Richard, Mehdi Essoloh, Hichem Snoussi, Sensor Array and Multichannel Signal Processing Workshop, 2008, SAM 2008, 5th IEEE, the entirety of which is incorporated herein by this reference.

Figure 5:
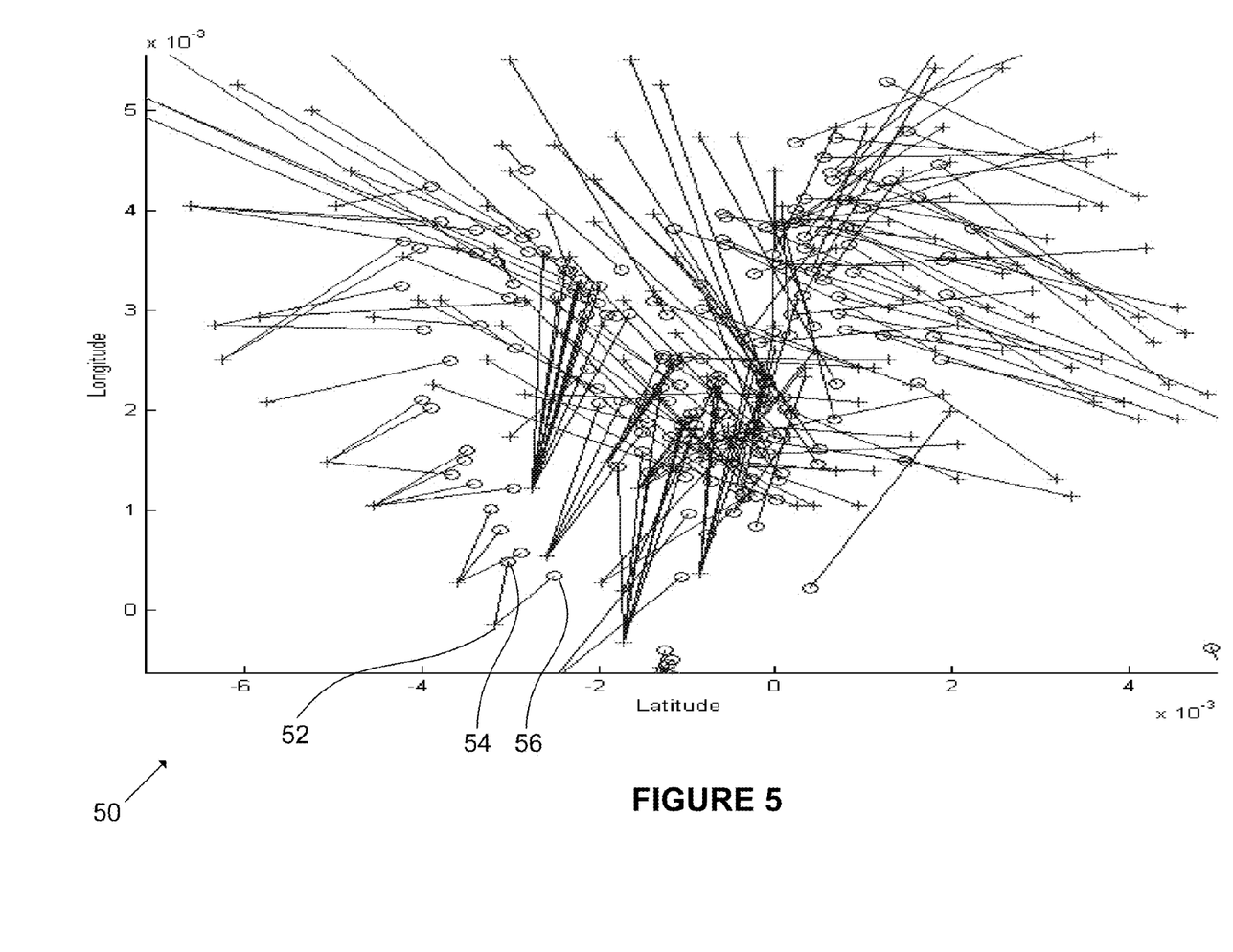
FIG. 5 is a coordinate graph providing a comparison of actual coordinates and virtual coordinates for nodes in an exemplary network.

FIG. 5 illustrates a coordinate graph providing a comparison of actual coordinates and a virtual coordinates for nodes in an exemplary network. In this example, the network included 235 nodes (not all of which are shown in FIG. 5). The crosses (e.g., cross 52) represent actual geographical location and the circles (e.g., circles 54 and 56) represent the computed virtual location, based on the RF distance information. In this example, to determine virtual node locations, 14 nodes were used as reference nodes, i.e., the actual geographic locations of those nodes were used as input in the method used to calculate the node virtual locations. As illustrated in FIG. 5, nodes with radios having poor connectivity are isolated, i.e., tend to have RF-distance coordinates towards the outside of the grouping of nodes. Such nodes are thus less likely to be used during message routing given these virtual locations. In contrast, nodes having radios that have good connectivity are generally positioned more towards the center of the grouping and thus will likely be used more frequently in message routing.

The example of FIG. 5 illustrates how two nodes having the same geographic location, for example, at cross 52, can, and typically will, have different virtual locations, as shown by the different virtual locations represented at circles 54 and 56. Thus, one benefit of certain methods and systems is the resolution of routing issues sometimes encountered with co-located nodes, e.g., nodes located within 30 feet on a horizontal plane of one another, nodes located in a same meter bank, or nodes located at the same street address. In addition, network performance can be improved in other ways.

Example of Using a Central Computer to Determine a Node Virtual Location

In certain embodiments, a central computer can be used to determine virtual locations used in network routing decisions. Such a computer may comprise, for example, software tools and applications that execute to perform the functions and steps described herein. As is known to one of skill in the art, such applications may be resident in any suitable computer-readable medium and execute on any suitable processor. For example, a device may have a computer-readable medium, such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. Instructions may comprise code from any suitable computer-programming language, including, for example, C, C++, C#, Visual Basic, Java, Python, Perl, and JavaScript. A central computer may also comprise a number of external or internal devices such as a mouse, a CD-ROM, DVD, a keyboard, a display, or other input or output devices. A central computer may be implemented as a server, which may be a single computer or implemented in a network of computers and/or processors.

Network nodes may also be computing devices and may include various amounts of information storage and processor capabilities depending on the requirements imposed on such devices by the particular network in which the devices are used.

Whether made at a central computer, at a node, at an access point, or elsewhere, a determination of node virtual locations may, in some circumstances, be made on a node by node basis. For example, this may be appropriate when only a single new node is introduced into an existing network. In other circumstances, determinations for virtual locations for multiple or all nodes may be made simultaneously. For example, this may be appropriate during deployment of a new network or in circumstances in which multiple new nodes have been introduced into an existing network.

The following provides an example of introducing a new node into a network for the purposes of illustrating one method of determining, distributing, and using a virtual node location. Other techniques may also be used. The first time a node is installed within a network, it might not be programmed with its actual location and a central computer may not know about it. A node in this situation could enter a special mode in which it listens and identifies its neighbors, identifying among its neighbor which one is the closest to the access point and that provides access to the central computer. For example, this can be done by assigning to each node the number of hops required to reach the access point. Once this nearest-to-access-point neighbor has been identified, the new node can send a packet to that neighbor for delivery to the central computer via the access point. It can simply forward this packet to the a node that has the least distance to the central computer and/or access point, and the packet will reach its destination after a few hops.

Figure 6:
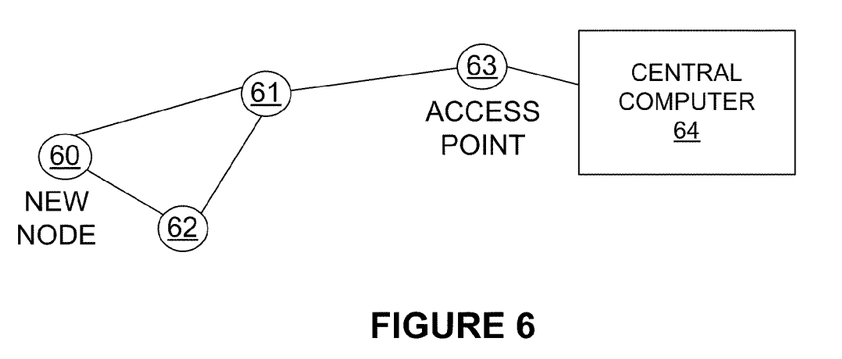
FIG. 6 is a network topology diagram illustrating a mesh network topology in which a new node sends an initial message to a central computer.

For example, in FIG. 6, a new node 60 can send a message to node 61 rather than node 62 based on information that there are fewer hops to the access point 63 from node 61 than from node 62. After receiving the message from node 60, node 61 will send the message to access point 63, which will then pass the message to the central computer 64. Such a message can be used to initiate and provide information (e.g., RF distances to neighboring nodes) for a determination of a virtual location for the new node (and possible recalculation of virtual locations for other nodes as well).

Generally, the nodes of a network can periodically send a packet to the central computer that list their respective neighbors, even after they have been configured. The central computer can use this information to check and identify changes in the node locations during the life of the network. Such changes may prompt calculation or recalculation of some or all of the virtual node locations used by the network. Generally, such virtual locations can be refined and reprogrammed any time, as determined appropriate for the particular system that is implemented.

A central computer may have access to additional information about the location of the nodes, such as the street address of certain nodes. A geo-coding of the street address can provide coordinates with a confidence score. A central computer may select a subset of nodes to use as reference nodes, i.e., nodes for which the actual geographic locations will be used in calculating virtual locations in the network. Selection of such reference nodes may be based in part on which nodes have the highest confidence, i.e., which actual node locations provided by geo-coding are most accurate. While adding such reference points is not required, it may decrease the complexity of the computation of virtual node locations.

Once a central computer identifies a new node added to a network, it can determine an appropriate virtual location for that node. Such virtual location information about the node can be used in a variety of ways. For example, in some systems a central computer will itself control routing decisions throughout the network and thus will provide routing information to nodes. In other systems, nodes themselves will make routing determinations. Thus, in various circumstances, a central computer may send the computed virtual coordinates to the nodes of the network for use in routing determinations.

In some circumstances, a central computer will have access to actual coordinates and/or virtual coordinates for all of the nodes of a network. In addition, a central computer will also have information identifying which of the nodes in a network (if any) have been configured. Such information about node location and which nodes are configured can be used by a central computer to send newly determined virtual locations (e.g., for a newly-introduced node) into the network for delivery to the appropriate nodes. For example, a central computer may rely on nodes that are already fully configured to transmit a newly-determined virtual location to the newly-introduced node to which that virtual location corresponds.

In the example of FIG. 6, for example, a central computer 64 can select the closest configured node to the non-configured one, i.e., determining that node 62 is closest to the new node 60. Such a determination of which node is closest may involve comparing actual node locations, comparing virtual node locations, or comparing a combination of both. For example, if all nodes of a network are given virtual locations, then the node 62 may be identified because its virtual location is closest to the newly-determined virtual location of new node 60. In another example, node 62 may only have an actual location associated with it in a system while node 61 has a virtual location. In such a scenario, node 62 may still be selected by determining that the actual location of node 62 is closer than the virtual location of node 61 (or any other node) is to the newly-determined virtual location of node 60. Such comparison can be facilitated if virtual locations and actual locations utilize the same coordinate system, e.g., if both use latitude and longitude, etc. Generally, it is noted that node virtual location information can be used as an alternative to or as a supplement to actual location information, for a variety of network purposes and benefits.

Returning to the example of sending a newly-determined virtual location to the new node 60, once a closest neighbor to a new node 60 is identified, the central computer can send the virtual location and/or configuration data to node 62 using the network's normally-employed routing methods. When node 61 receives the virtual location and/or configuration information for new node 60, it can search a neighbor list that it maintains to determine which one should receive the information. New node 60 may be a part of that neighbor list as a result of prior communication between node 62 and new node 60. Once identified, node 62 can send the information directly to new node 60. Upon receiving the information, the new node can configure itself as a fully-configured node in the mesh network. New node 60 can also notify the central computer 64 that the configuration was successful and that thereafter new node 60 can be used as any other configured node. The new node's virtual location can also be provided to all of the new node's neighbor, e.g., all neighbors identified on the new node's neighbor list if that is how such information is tracked and used.

In alternative embodiments, the introduction of one or more new nodes may trigger a central computer to recalculate virtual locations for the one or more new nodes, as well as, recalculate new virtual locations for one or more previously-configured nodes. This is because the introduction of the new nodes may change the RF-distance topography of the network. Determining whether to re-calculate virtual locations for some or all of the previously-configured nodes in a network can be based on various factors, e.g., the number of new nodes introduced, number of neighbors of the newly introduced nodes, the RF-distances to such neighbors, or any other factor or combination of factors that provide an estimate of how much the introduction of the new node(s) changes the RF-topography of the network. In some systems, as an example, a network may recalculate virtual node locations after introduction of 5 or 10 new nodes. If one new node is added every day, then each day the day's new node will be given a virtual location, and, after 5 or 10 days, the virtual locations of all nodes can be recalculated.

Exemplary Method of Determining a Virtual Node Location Using RF Distances

Figure 7:
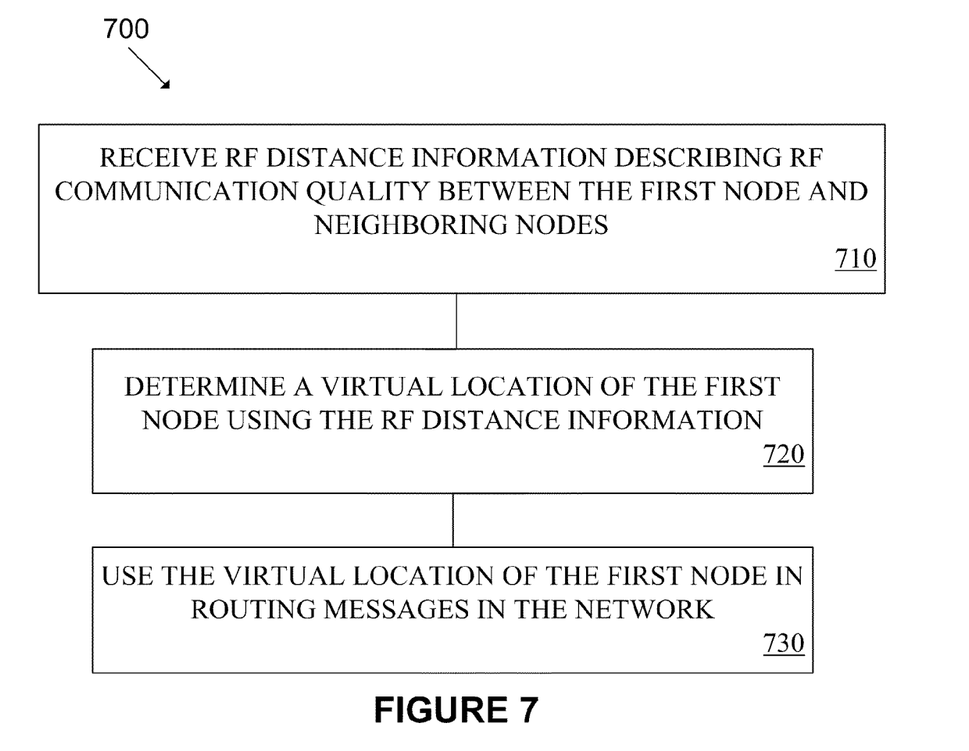
FIG. 7 is a flow chart illustrating an exemplary method of determining a virtual location for a node using RF distances.

FIG. 7 is a flow chart illustrating an exemplary method 700 of determining a virtual location for a node using RF distances. This method may be used in a variety of networks and may be particularly useful in mesh networks. The exemplary method 700 involves receiving RF distance information describing RF communication quality between a first node and each of one or more neighboring nodes in a network, as shown in block 710. A received signal strength indication (RSSI) or a packet success rate (PSR) are examples of RF distance information.

The exemplary method 700 also involves determining a virtual location of the first node using the RF distance information, as shown in block 720. Such virtual location is determined so that a distance of the virtual location of the first node from a geographic location or a virtual location of a second node corresponds to a quality of communication between the first node and second node. Such virtual locations are useful for a variety of determinations and can be particularly useful in routing. For example, virtual locations for one or more nodes can be used to determine routing by using such locations in place of, or in addition to, traditional geographic locations. In addition, determining the virtual location of the first node can further be based on reference points which provide an actual, geographic locations of certain nodes of the network. Such reference points can simplify and/or enhance the determination of virtual locations.

Determining the virtual location of the first node can be part of a determination of virtual locations for multiple nodes of the network. Such a determination of multiple nodes of the network can be based on additional RF distance information. For example, for each of the multiple nodes, the additional RF distance information could describe a quality of RF communication between that node and one or more of its neighboring nodes. Such a determination of multiple nodes of the network can also be based on reference points of the geographic locations of certain nodes of the network.

The exemplary method 700 further comprises using the virtual location of the first node in routing messages in the network, as shown in block 720. For example, routing messages in a given network may be based in part on routing algorithms employed at a central computer or at network nodes that select next hops for a message based on the location coordinates of potential recipients. In such an algorithm, the routing decision could utilize a virtual node location for one or more of the potential recipients. In addition, such comparisons may involve comparing potential recipient locations to the sending nodes location and/or to a final destination location, e.g., to select a closest node to send a message to or to determine which potential recipient is closest to the final destination, etc. Accordingly, such techniques can utilize a virtual location as the location of the sending node or of the final destination. In short, various combinations of virtual node locations and actual node locations can be utilized in a variety of techniques for routing messages.

General

The foregoing description of the embodiments of the invention has been presented only for the purpose of illustration and description and is not intended to be exhaustive or to limit the invention to the precise forms disclosed. For example, the uses of virtual locations in network routing are numerous and not limited by the examples described herein. The techniques of the invention are not limited to radio networks, meter systems, mesh networks, or any particular network configuration. In general, numerous modifications and adaptations are apparent to those skilled in the art without departing from the spirit and scope of the invention.

That which is claimed:

1. A method comprising:
   receiving radio frequency (RF) distance information for a first node of a wireless network, wherein the RF distance information describes wireless communication quality between the first node and each of one or more neighboring nodes in the wireless network;
   determining a virtual location of the first node using the RF distance information, wherein a distance of the virtual location of the first node from a geographic location or a virtual location of a second node is based on wireless communication quality between the first node and second node; and
   providing the virtual location of the first node for use in routing messages in the wireless network, wherein the first node is associated with location information comprising both the virtual location of the first node and an actual location of the first node different from the virtual location of the first node, wherein messages are routed using an algorithm that uses actual locations and virtual locations of nodes, wherein, in routing decisions, an actual location of a respective node is only used if a virtual location of the respective node is not available.

2. The method of claim 1 wherein determining the virtual location of the first node is further based on a plurality of reference points, wherein the plurality of reference points comprise a plurality of geographic locations of a plurality of nodes of the wireless network.

3. The method of claim 1 wherein determining the virtual location of the first node is part of a determination of virtual locations for multiple nodes of the wireless network, wherein the determination of virtual locations for multiple nodes of the wireless network is based on:
   additional RF distance information for the multiple nodes, wherein, for each of the multiple nodes, the additional RF distance information describes a quality of RF communication between the node and one or more of its neighboring nodes; and
   a plurality of reference points, wherein the plurality of reference points comprise a plurality of geographic locations of a plurality of nodes of the wireless network.

4. The method of claim 1 wherein the virtual location of the first node is different from a virtual location of a third node, wherein the first node and third node are co-located at a same street address.

5. The method of claim 1 wherein determining the virtual location of the first node is part of a determination of virtual locations for all of the nodes of the wireless network.

6. The method of claim 1 wherein a central server determines the virtual location of the first node using the RF distance information.

7. The method of claim 1 wherein the RF distance information comprises a received signal strength indication (RSSI).

8. The method of claim 1 wherein the RF distance information comprises a packet success rate (PSR).

9. The method of claim 1 further comprising selecting a next node to send a packet based at least in part on the virtual location of the first node.

10. A system comprising:
a mesh network of nodes;
a central computer, wherein the central computer is configured to:
receive radio frequency (RF) distance information for a first node of the mesh network, wherein the RF distance information is based on a quality of RF communication between the first node and each of one or more neighboring nodes in the mesh network;
determine a virtual location of the first node using the RF distance information, wherein a distance of the virtual location of the first node from a geographic location or a virtual location of a second node is based on a quality of communication between the first node and second node; and
provide the virtual location of the first node for use in routing messages in the mesh network, wherein the first node is associated with location information comprising both the virtual location of the first node and an actual location of the first node different from the virtual location of the first node, wherein messages are routed using an algorithm that uses actual locations and virtual locations of nodes, wherein, in routing decisions, an actual location of a respective node is only used if a virtual location of the respective node is not available.

11. The system of claim 10 wherein one or more of the nodes correspond to meter reading devices.

12. The system of claim 10 wherein determining the virtual location of the first node is further based on a plurality of reference points, wherein the plurality of reference points comprise a plurality of geographic locations of a plurality of nodes of the mesh network.

13. The system of claim 10 wherein determining the virtual location of the first node is part of a determination of virtual locations for multiple nodes of the mesh network, wherein the determination of virtual locations for multiple nodes of the mesh network is based on:
additional RF distance information for multiple nodes, wherein, for each of the multiple nodes, the additional RF distance information describes a quality of RF communication between the node and one or more of its neighboring nodes; and
a plurality of reference points, wherein the plurality of reference points comprise a plurality of geographic locations of a plurality of nodes of the mesh network.

14. The system of claim 10 wherein the first node and a third node are co-located in a same meter bank, wherein the virtual location of the first node is different from a virtual location of a third node.

15. The system of claim 10 wherein message routing decisions are made at the nodes of the mesh network using virtual locations of at least some of the nodes.

16. The system of claim 10 wherein message routing decisions are made at the central computer using virtual locations of at least some of the nodes.

17. A method comprising:
sending a message from a newly-introduced node to a central computer, wherein the message identifies radio frequency (RF) distance information based on a quality of RF communication between the newly-introduced node and each of one or more neighboring nodes in a network into which the newly-introduced node is being introduced;
receiving, at the newly-introduced node, a virtual location determined for the newly-introduced node using the RF distance information, wherein a distance of the virtual location of the newly-introduced node from a geographic location or a virtual location of a second node is based a quality of communication between the newly-introduced node and the second node; and
using, at the newly-introduced node, the virtual location in routing message in the network, wherein the newly-introduced node is associated with location information comprising both the virtual location of the newly-introduced node and an actual location of the newly-introduced node different from the virtual location of the newly-introduced node, wherein messages are routed using an algorithm that uses actual locations and virtual locations of nodes, wherein, in routing decisions, an actual location of a respective node is only used if a virtual location of the respective node is not available.

18. The method of claim 17 wherein routing messages in the network further comprises using virtual locations for additional nodes of the network.

19. The method of claim 17 further comprising sending the virtual location of the newly introduced node to the neighboring nodes for use in routing messages in the network.

* * * * *